Figure 1:
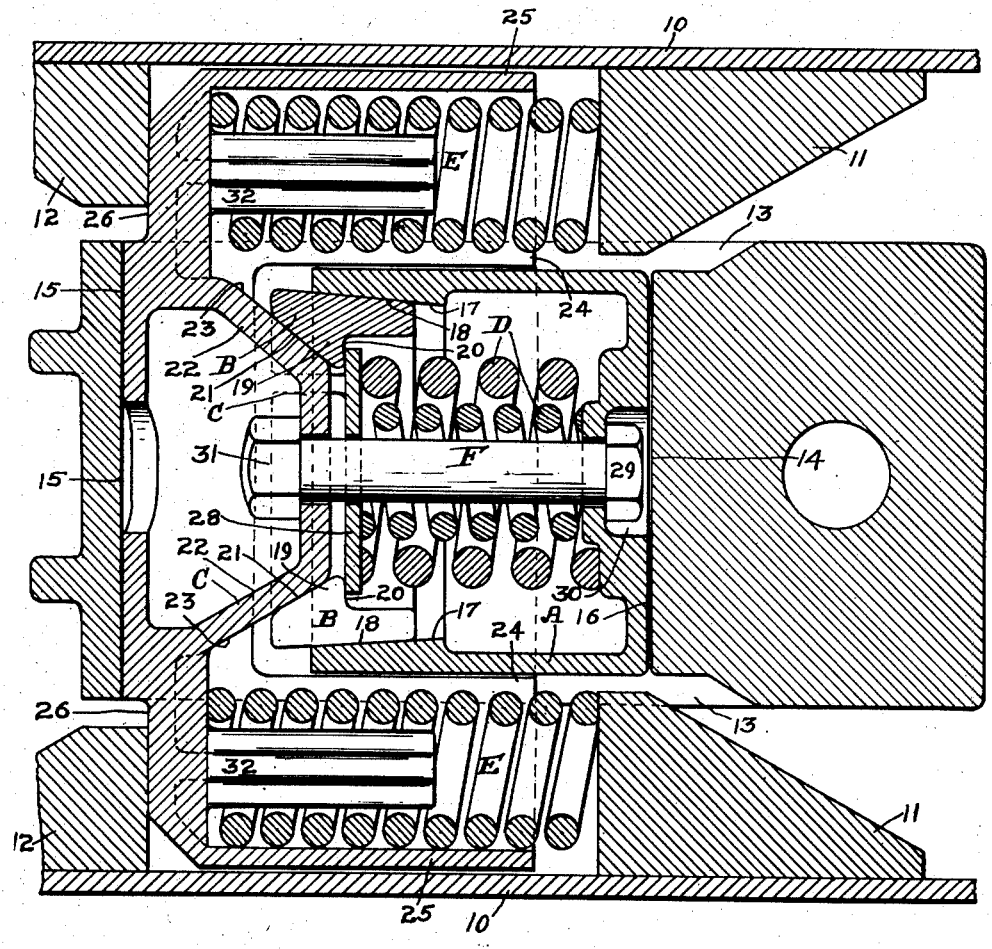

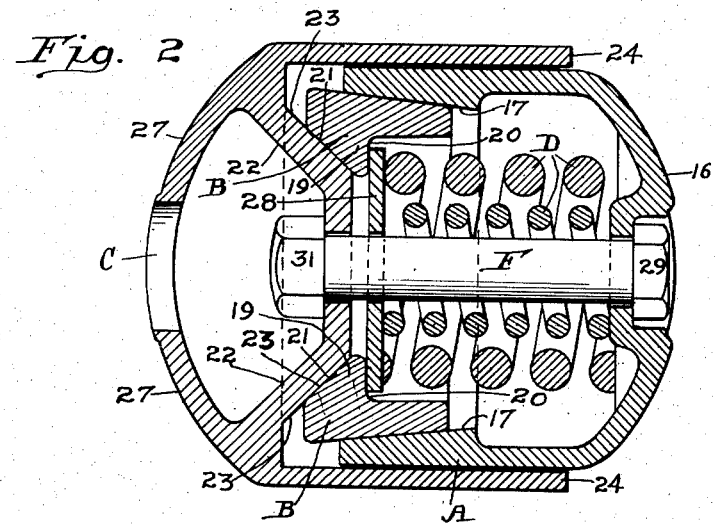
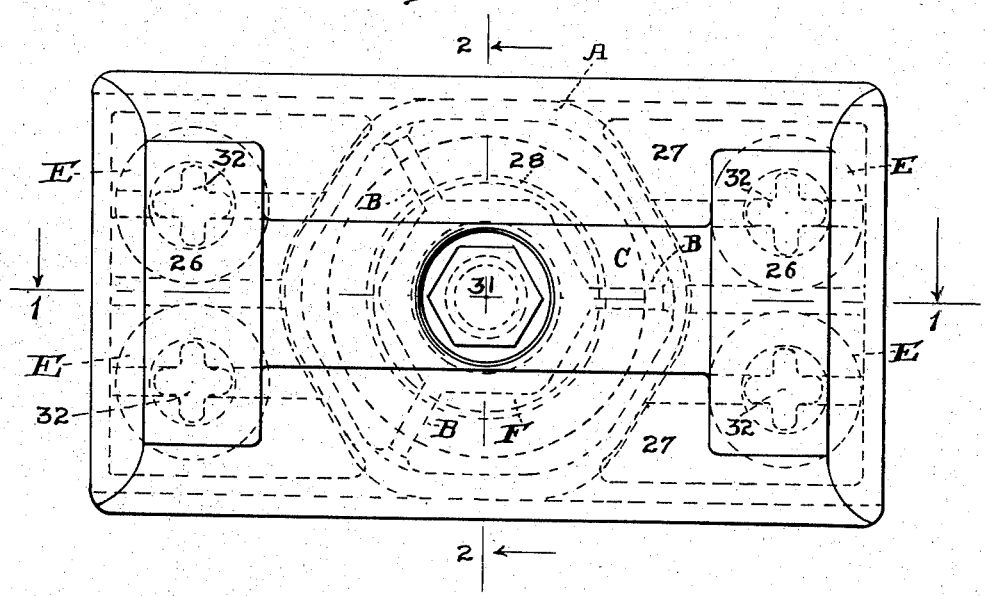

Patented June 5, 1951

2,555,399

UNITED STATES PATENT OFFICE 2,555,399

FRICTION SHOCK ABSORBING MECHANISM FOR RAILWAY DRAFT RIGGING

George E. Dath, Mokena, Ill., assignor to W. H. Miner, Inc., Chicago, Ill., a corporation of Delaware Application April 14, 1948, Serial No. 20,892

6 Claims. (Cl. 213—32)

This invention relates to improvements in friction shock absorbing mechanisms more particularly adapted for draft riggings of railway locomotives and cars.

One object of the invention is to provide a friction shock absorbing mechanism especially adapted for railway draft riggings having relatively short pockets for accommodating the mechanism.

A further object of the invention is to provide a friction shock absorbing mechanism of the character indicated having free spring action in buff and high frictional resistance in draft, including a friction casing, friction shoes slidingly telescoped within the casing, a combined wedge and follower member for spreading the shoes apart into tight frictional engagement with the interior friction surfaces of the casing, spring means within the casing yieldingly opposing movement of the friction shoes inwardly of the casing, and additional spring means yieldingly opposing movement of the combined wedge and follower member in draft to provide purely spring action, wherein the friction casing and combined wedge and follower member are relatively movable toward each other in buff to wedge the friction shoes apart and force the same inwardly of the casing to produce high frictional resistance for absorbing the relatively heavy buffing shocks.

Other objects of the invention will more clearly appear from the description and claims hereinafter following.

In the accompanying drawings forming a part of this specification, Figure 1 is a longitudinal, horizontal sectional view of a portion of a railway draft rigging showing my improved friction shock absorbing mechanism in connection therewith, the section through the improved mechanism corresponding substantially to the line 1—1 of Figure 3. Figure 2 is a longitudinal, vertical sectional view of the friction shock absorbing mechanism shown in Figure 1, corresponding substantially to the line 2—2 of Figure 3. Figure 3 is a front elevational view, looking from left to right in Figure 2.

My improved friction shock absorbing mechanism, as illustrated in the drawings, comprises broadly a friction casing A, three friction shoes B—B—B, a combined wedge and follower member C, a spring resistance D within the friction casing opposing inward movement of the shoes and combined wedge and follower member, additional springs E—E and E—E reacting between the combined wedge and follower member C and the stop lugs on the draft sills of the railway draft rigging, and a retainer bolt F.

The improved friction shock absorbing mechanism is illustrated in the drawings as contained in the usual draft gear pocket of the underframe structure of a railway car, a portion of such an underframe structure being shown in Figure 1 of the drawings. The underframe structure illustrated is of the usual type employed in locomotives and comprises longitudinally extending, laterally spaced draft sills 10—10, provided with outer and inner stop lugs 11—11 and 12—12 on the inner sides thereof. The usual draft yoke, within which my improved mechanism is contained, is indicated by 13. The pocket of the yoke 13 presents vertically extending, transverse, interior walls 14 and 15 at opposite ends thereof, that is, at the outer and inner ends. The walls 14 and 15 of the yoke are vertically curved, or rounded, as is the usual practice in yokes of the character employed.

The friction casing A is open at one end and closed at the other by a transverse, vertical end wall 16, which is rounded, as shown, to bear on the rounded wall 14 of the yoke. As shown, the casing A is of hexagonal, transverse cross section and presents three inwardly converging, interior friction surfaces 17—17—17 of V-shaped, transverse section at its open end.

The friction shoes B, which are three in number, are slidingly telescoped within the open end of the casing A. Each shoe B has a friction surface 18 of V-shaped, transverse section on its outer side, engaging with one of the V-shaped surfaces 17 of the casing A. Each shoe is laterally inwardly enlarged at the outer end portion thereof, as indicated at 19, thus providing a transverse abutment face 20 on said shoe at the rear end of the enlargement. The enlargement 19 of each shoe presents a wedge face 21 on the inner side thereof, which is of V-shaped, transverse section.

The combined wedge and follower member C comprises a relatively heavy, substantially rectangular plate having a rearwardly extending wedge projection 22, which is located centrally between opposite ends of the plate. The wedge projection 22 is hollow and of hexagonal, transverse, exterior cross section, presenting three rearwardly extending, exterior wedge faces 23—23—23 of V-shaped, transverse cross section, correspondingly inclined to and engaging respectively with the wedge faces 21—21—21 of the shoes B—B—B. The plate portion of the combined wedge and follower member C has an inwardly extending, peripheral flange thereon, providing vertically spaced top and bottom walls 24—24, and laterally spaced, vertical side walls 25—25. The combined wedge and follower member C thus presents a hollow boxlike structure, which is engaged over the open end of the casing A and the springs E. At the forward side thereof, the plate portion of the member C presents substantially flat, vertically disposed abutment faces 26—26 at opposite ends, cooperating with the inner stop lugs 12—12. The front or outer surface of the member C between the faces 26—26 is rounded, as indicated at 27, to fit the end wall 15 at the inner end of the yoke 13.

The spring resistance D comprises a relatively light, inner coil and a heavier outer coil, arranged within the casing A and interposed between the wall 16 at the closed end of the casing and the friction shoes B—B—B, having the front ends bearing on a follower plate 28, which, in turn, bears on the abutments 29—29—29 of the shoes.

The combined wedge and follower member C is anchored to the friction casing A by the retainer bolt F, which extends through the inner coil of the spring resistance D. The bolt F is connected at one end to the casing A by the head thereof which is indicated by 29, said head being accommodated in an inwardly projecting, hollow, central boss 30 on the wall 16 of the casing. The other end of the bolt F is connected to the combined wedge and follower member C by the nut thereof, which is indicated by 31, said nut being accommodated within the hollow wedge projection 22 of the combined wedge and follower member.

The springs E are arranged in pairs at opposite sides of the casing A, within the hollow, boxlike structure of the combined wedge and follower member C. The springs E—E of each pair bear at opposite ends, respectively, on the corresponding outer stop lug 11 and the inner side of the plate portion of the combined wedge and follower member C. The springs E—E of each pair are held centered by inwardly projecting centering rods or arms 32—32 on the corresponding side of the platelike structure of the member C, said arms extending into the coils of said springs.

The operation of my improved friction shock absorbing mechanism is as follows: Upon outward movement of the yoke 13 in draft, that is, upon movement of the yoke toward the right, as viewed in Figure 1, the combined wedge and follower member C and the friction casing A move as a unit with the yoke 13, movement of the combined member compressing the springs E—E and E—E against the stop lugs 11—11, thereby providing spring action only, there being no compression of the friction shock absorber proper of the device. In buff, the yoke 13 is moved inwardly, that is, toward the left, as seen in Figure 1, forcing the friction casing A toward the combined wedge and follower member C, which at this time is held stationary by the stop lugs 12—12. The friction mechanism is thus compressed against the stop lugs 12—12, the friction clutch comprising the wedge projection 22 of the combined wedge and follower member and the shoes B—B—B being moved inwardly with respect to the casing, the wedge projection 22 spreading the shoes apart and forcing the same inwardly of the casing against the spring resistance D. High frictional resistance is thus provided during the buffing stroke of the mechanism. As will be evident, during this buffing action, the springs E—E and E—E remain inactive.

Compression of the mechanism in both buff and draft is positively limited by engagement of the plate portion of the combined wedge and follower member C with the open end of the friction casing A.

I claim:

1. In a friction shock absorbing mechanism for a railway draft rigging, including inner and outer stop lugs and a lengthwise movable yoke, the combination with a combined wedge and follower member held against inward movement by engagement with said inner stop lugs, said member being movable with the yoke toward said outer stop lugs in draft and held stationary by said inner stop lugs in buff; of a friction casing, said casing being movable with said yoke toward said member in buff, said casing having interior friction surfaces; friction shoes within the casing slidable on the friction surfaces thereof; cooperating wedge faces on said member and shoes; a spring within the casing yieldingly opposing movement of said shoes inwardly of the casing; and spring means at opposite sides of the casing bearing at one end on said member and at the opposite end on said outer stop lugs to oppose movement of said member toward said outer stop lugs.

2. In a friction shock absorbing mechanism for a railway draft rigging having a draft gear pocket provided with stops at opposite ends thereof and a lengthwise movable yoke, the combination with a combined wedge and follower member held against lengthwise movement in one direction by the stops at one end of said pocket, and having shouldered engagement with said yoke to be moved in a reverse direction toward the stops at the other end of said pocket; of springs bearing at opposite ends on said member and the stops at said last named end of the pocket respectively, to yieldingly oppose movement of said member toward said stops; a friction casing, said casing having shouldered engagement with said yoke to be moved toward said member while the latter is being held against movement by said stops at said first named end of the pocket, said casing having interior friction surfaces; friction shoes within the casing slidable on the friction surfaces thereof; cooperating wedge faces on said member and shoes, and a spring within the casing yieldingly opposing movement of said shoes inwardly of the casing.

3. In a friction shock absorbing mechanism for a railway draft rigging, having a draft gear pocket provided with inner and outer stops at opposite ends thereof, and a lengthwise movable coupler actuated yoke, the combination with a combined wedge and follower member held against movement in one direction lengthwise of the mechanism by engagement with the stops at one end of said pocket, said member having shouldered engagement with said yoke to be moved with said yoke when the latter is moved in one direction to move said member toward the stops at the other end of said pocket; springs bearing at opposite ends on said member and said last named stops respectively, to yieldingly resist movement of said member toward said last named stops; a friction casing within the yoke and having shouldered engagement therewith to be moved thereby in a reverse direction to said first named direction toward said member while the latter is held stationary by the stops at said first named end of the pocket, said casing having interior friction surfaces; friction shoes within the casing slidable on the friction surfaces thereof, said shoes and member having cooperating wedge faces; and a spring within the casing yieldingly opposing movement of said shoes inwardly of the casing.

4. In a combined friction and spring shock absorbing mechanism for a railway draft rigging having a draft gear pocket provided with stops at opposite ends thereof, and a lengthwise movable yoke, the combination with a friction shock absorber disposed within said yoke, said friction shock absorber including a friction casing, friction shoes slidable within the casing, a spring opposing inward movement of said shoes, and a combined wedge and follower member having wedging engagement with the shoes, said friction shock absorber having shouldered engagement at opposite ends with said yoke to be moved as a unit lengthwise of the mechanism in one direction with said yoke; of spring means bearing at one end on the stops at one end of said pocket and at the other end on said member for yieldingly resisting movement of said member toward said last named stops when moved by said yoke in the direction last named, said member having shouldered engagement with the stops at the other end of the pocket to be held against movement when said yoke is moved lengthwise in a reverse direction.

5. In a friction shock absorbing mechanism, the combination with a fixed stop; of a friction casing closed at one end by a transverse wall rigid with said casing and open at the other end, said casing having interior friction surfaces at said open end; friction shoes slidingly engaged with the friction surfaces of said casing; a wedge member having wedge faces engaging said shoes, said wedge member and casing being relatively movable toward and away from each other lengthwise of the mechanism; a spring within the casing buttressed against said transverse wall and yieldingly opposing movement of the shoes and wedge member inwardly of the casing; and additional springs exterior to said casing arranged in pairs at opposite sides thereof, and bearing at opposite ends on said wedge member and fixed stop to yieldingly oppose movement of said wedge member toward said stop.

6. In a friction shock absorbing mechanism for a railway draft rigging, including inner and outer fixed stops, and a lengthwise movable yoke, the combination with a friction casing having interior friction surfaces at one end, said casing having shouldered engagement at its other end with one end of said yoke; of friction shoes slidingly engaged with the friction surfaces of the casing; a combined wedge and follower member having wedge faces engaging said shoes, said member being in shouldered engagement with the other end of said yoke, said casing and member being movable toward and away from each other, and said member having shouldered engagement with said inner stop to hold the same against inward movement; a spring within the casing yieldingly opposing movement of said shoes and member toward said casing; and additional springs exterior to said casing and bearing at opposite ends on said member and the outer fixed stop respectively, to yieldingly oppose movement of said member toward said outer fixed stop.

GEORGE E. DATH.

REFERENCES CITED

The following references are of record in the file of this patent:

UNITED STATES PATENTS

| Number | Name | Date |
| --- | --- | --- |
| 1,303,372 | Nystrom | Nov. 13, 1919 |
| 1,831,173 | Hall | Nov. 10, 1931 |
| 2,469,549 | Dath | May 10, 1949 |